(12) United States Patent
    Kricorissian (10) Patent No.: US 7,878,405 B2
(45) Date of Patent: Feb. 1, 2011

(54) DUAL LASER TARGETING SYSTEM

(75) Inventor: Gregg R. Kricorissian, Ottawa (CA)

(73) Assignee: Psion Teklogix Systems Inc., Mississauga (CA)

( * ) Notice: Subject to any disclaimer, the term of this patent is extended or adjusted under 35 U.S.C. 154(b) by 428 days.

(21) Appl. No.: 11/006,163

(22) Filed: Dec. 7, 2004

(65) Prior Publication Data

US 2006/0118626 A1   Jun. 8, 2006

(51) Int. Cl.
    *G06K 7/10* (2006.01)
    *G06K 9/24* (2006.01)
(52) U.S. Cl. .................. 235/462.21; 235/454
(58) Field of Classification Search ............. 235/454, 235/462.2, 462.21, 462.42
    See application file for complete search history.

(56) References Cited

U.S. PATENT DOCUMENTS

| | | | | |
|---|---|---|---|---|
| 4,787,291 A | | 11/1988 | Frohock, Jr. | |
| 5,010,241 A | * | 4/1991 | Butterworth | 235/462.24 |
| 5,414,268 A | | 5/1995 | McGee | |
| 5,500,516 A | * | 3/1996 | Durbin | 235/472.01 |
| 5,500,702 A | * | 3/1996 | Meyers | 396/431 |
| 5,585,616 A | * | 12/1996 | Roxby et al. | 235/462.06 |
| 5,598,007 A | * | 1/1997 | Bunce et al. | 250/566 |
| 5,756,981 A | | 5/1998 | Roustaei et al. | |
| 6,105,869 A | * | 8/2000 | Scharf et al. | 235/454 |
| 6,340,114 B1 | | 1/2002 | Correa et al. | |
| 6,628,445 B2 | | 9/2003 | Chaleff et al. | |
| 6,729,546 B2 | * | 5/2004 | Roustaei | 235/462.45 |
| 6,808,114 B1 | * | 10/2004 | Palestini et al. | 235/454 |
| 7,163,150 B2 | * | 1/2007 | Kricorissian et al. | 235/462.21 |
| 2004/0206819 A1 | * | 10/2004 | Okada et al. | 235/454 |

FOREIGN PATENT DOCUMENTS

| | | |
|---|---|---|
| EP | 0 735 341 | 10/1996 |
| EP | 1 172 756 | 1/2002 |
| JP | 07159534 | 6/1995 |

* cited by examiner

*Primary Examiner*—Daniel A Hess
*Assistant Examiner*—Rafferty Kelly
(74) *Attorney, Agent, or Firm*—Pearne & Gordon LLP (57) ABSTRACT

A dual laser targeting system is described. At least one pair of lasers is arranged symmetrically about an objective lens in a symbology reader. The lasers project a beam along their respective axis, which, when an optical element is placed in front of the laser, produces multiple beams concentric about each laser axis. These multiple beams produce a composite pattern that appears to be symmetrical about the optical axis of the objective lens. The resulting targeting pattern includes laser beam spots that frame the field of view (FOV) of the symbology reader, and the laser beam spots on the laser axes frame the optical center of the target.

9 Claims, 6 Drawing Sheets

DUAL LASER TARGETING SYSTEM

FIELD OF INVENTION

The present invention relates generally to the field of portable symbology readers, and more particularly to a laser targeting system for portable symbology readers.

BACKGROUND OF THE INVENTION

Image reading devices of the type that allow optimal imaging distances, include a targeting scheme of some kind useful solely in aligning the image reader to the target to obtain an optimal imaging distance from the target. Most of these techniques project a pattern onto the target from a targeting LED or laser diode. An aperture and light shaping optics are often used to project a pattern onto the target as an aid to the human operator to correctly position the image reader based on the targeting pattern.

The operator moves the image reader until targeting lines or dots converge at a predefined point, which relates to the point at which an acceptable image can be acquired. An acceptable image may be defined as one that contains sufficient resolution for post-processing. With this method, it may be difficult for the operator to determine which direction the device must be moved. Further, with this method, the operator can only capture an image at the predetermined distance at which the lines or dots converge, even though an acceptable image could potentially be acquired some distance before or beyond that point.

Many image readers use a single laser as a targeting pattern source, but single laser systems often suffer from parallax error. This refers to the discrepancy between the framing of an image and what is actually imaged. This is due to the fact that the laser and the line of sight of the lens are not aligned.

U.S. Pat No. 5,500,702, which issued to Meyers on Mar. 19, 1996 and European Patent EP1172756 to Datalogic S.P.A. both discuss the use of a refractive or diffractive element placed along the path of the single laser beam to create a multi-beam pattern. This pattern is intended to frame a target. Due to parallax error, however, any time the target is scanned from an angle, the targeting pattern skews and stretches and the error increases as the symbology reader diverges from the perpendicular. Also, the scan is only accurate at a particular distance.

Ideally, a targeting pattern should be projected from an optical source that is concentric with the optical center of the imaging lens. This assures accurate alignment of the pattern with the symbology being targeted. This approach, however, is impractical and complex.

Therefore there is a need for a targeting system that has a targeting pattern which is easy to use, is unaffected by errors of parallax, and yet is simple to implement.

SUMMARY OF THE INVENTION

The present invention is directed a laser targeting system for a symbology reader for reading a target using an objective lens. The system comprises at least one pair of lasers positioned adjacent to the objective lens such that the objective lens is in between the lasers, whereby the lasers project laser beams along their axes that are parallel to the objective lens optical axis. The targeting system further includes light shaping optical elements disposed in front of corresponding lasers for producing a composite beam pattern that is symmetrical about the objective lens optical axis adapted to encompass the target.

In accordance with a further aspect of the invention, the laser targeting system has one pair of lasers wherein the lasers are positioned directly opposite one another on either side of the objective lens and equidistant from the objective lens optical axis. Further, the lasers may be positioned horizontally or vertically with respect to the objective lens.

In accordance with another aspect of the invention, the laser targeting system has two pairs of lasers wherein the lasers are positioned symmetrically about the objective lens and equidistant from the objective lens optical axis.

In accordance with a further aspect of the invention, each optical element produces a beam pattern about the corresponding laser axis, wherein the beam pattern includes a laser beam spot on the laser axis and a number of beam spots about the laser axis. The number of beam spots may be four beam spots symmetrically positioned about the laser axis.

In accordance with a specific aspect of the invention, the optical elements may be prisms, diffractive optical elements or holographic optical elements. Further the objective lens and the targeting system may be mounted in a reader housing or the targeting system may be attached to a reader housing.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION

A conventional symbology reader, such as a portable image reader, comprises an image capture device, such as a CCD or CMOS image sensor, an objective lens mounted over the image sensor to provide a specific focal length, an illumination source to illuminate a target to be imaged, a targeting source and light shaping optics to direct a targeting pattern onto the target. The targeting pattern allows a human operator to align the image reader with the target, usually a barcode or the like.

The present invention provides a novel targeting system in symbology readers that provides a unique targeting pattern, which will permit a human operator to quickly and accurately position a symbology reader, such as a portable image reader, over a target.

The embodiments of the present invention will now be described in detail with reference to the provided figures.

Figure 1:
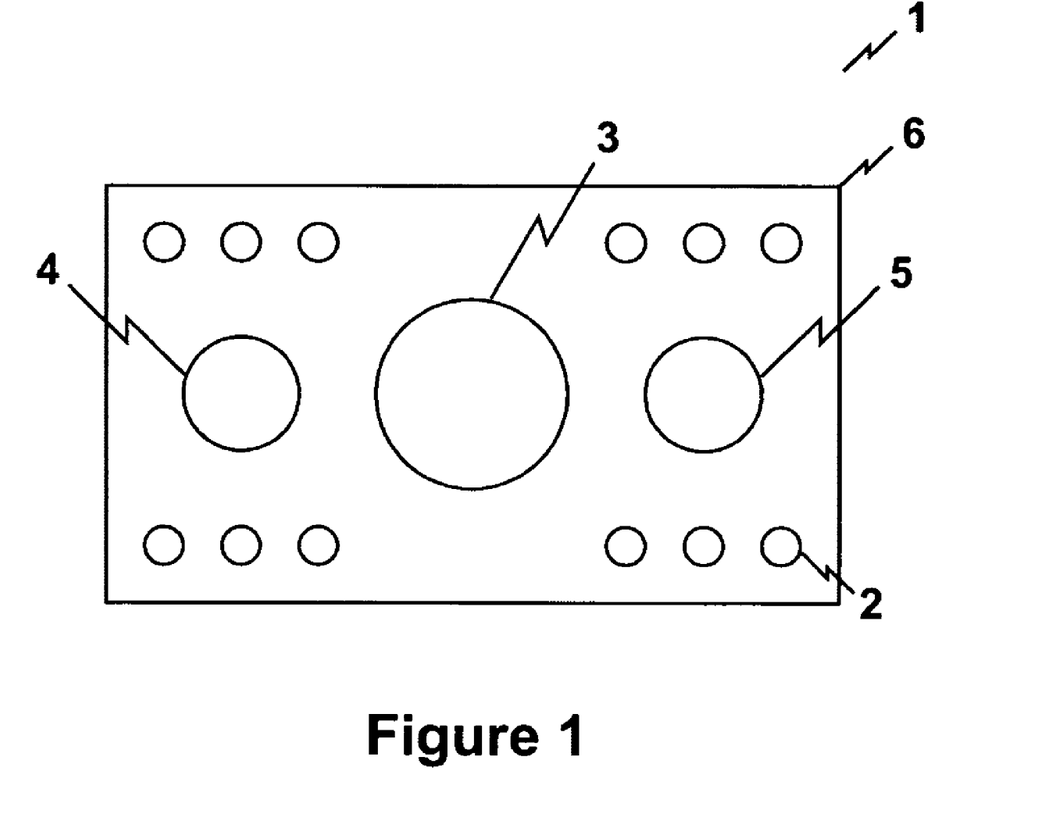
FIG. 1 is a front view of a first embodiment of a symbology reader in accordance with the present invention.

FIG. 1 shows the front view of a camera module housing 6 of a symbology reader 1 comprising the dual laser targeting system of the present invention. Light-emitting diodes (LEDs) are provided as an illumination source 2 to illuminate the target. Those skilled in the art will realize that the illumination source 2 is not limited to LEDs or a specific number of LEDs and any suitable equivalent fall within the scope of the invention. Objective lens 3 can be a conventional free-space objective lens commonly used in symbology readers or it can be a spherical, aspherical or multi-focus lens. A first laser 4 is used to define the right side of the image field and a second laser 5 is used to define the left side of the image field. The lasers 4 and 5 must be placed symmetrically about the lens to ensure proper framing of the center of the target. In the first embodiment of the present invention, the illumination source 2, the objective lens 3 and the first and second lasers 4 and 5, are all mounted within housing 6. The first and second lasers 4 and 5 emit laser beams that are in parallel with the optical axis of the symbology reader 1. When the first and second lasers 4 and 5 are projected together, they generate a composite pattern that appears to be symmetrical with the optical axis. Without any diffractive elements placed in front of the lasers 4 and 5, two parallel laser beams are produced, one on each side of lens 3.

Figure 2:
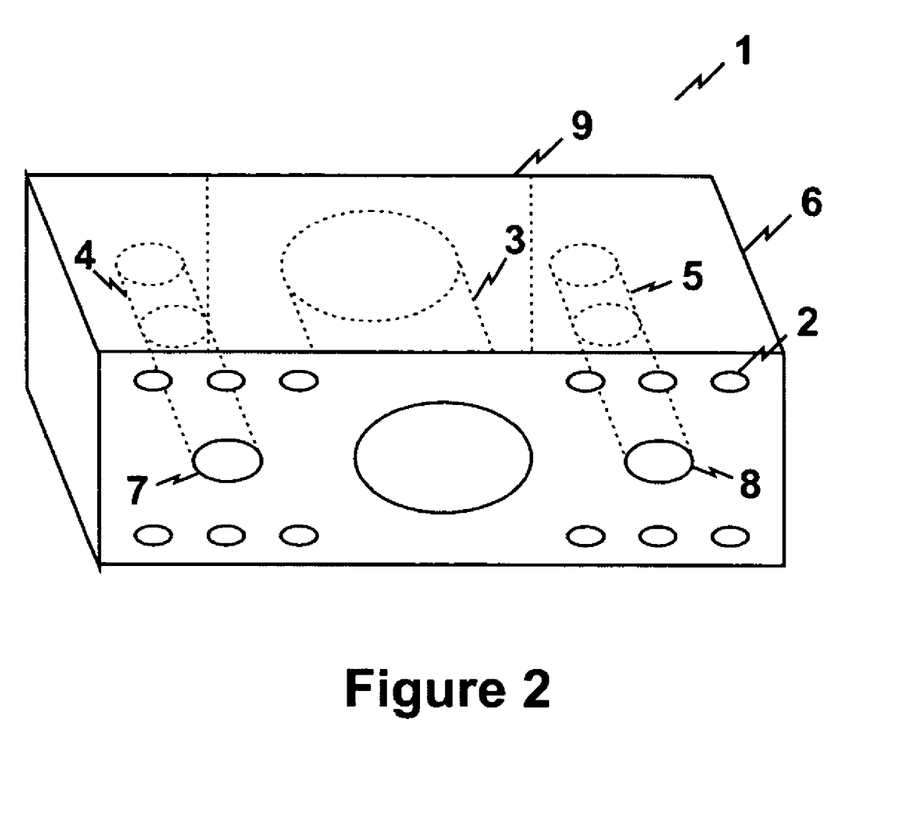
FIG. 2 is a front isometric view of FIG. 1.

FIG. 2 shows a front isometric view of camera module housing 6 of the symbology reader 1 of FIG. 1 comprising the dual laser targeting system of the present invention. First and second optical elements 7 and 8 are placed in front of first and second lasers 4 and 5 respectively to generate a unique targeting pattern. The optical elements in the preferred embodiment of the present invention comprise prisms, but any suitable optical element such as a diffractive optical element (DOE) or a holographic optical element (HOE) will fall within the scope of the present invention. The characteristics of optical elements 7 and 8 will be dependent on the desired targeting pattern. First and second optical elements 7 and 8 in FIG. 2 are shown as placed directly flush on first and second lasers 4 and 5. Those skilled in the art will realize that first and second optical elements 7 and 8 can be placed at any suitable distance in front of the lasers 4 and 5. Illumination source 2 illuminates the surface of a target object and the light is reflected back to imager board 9. The imager board 9 detects the light reflected from the object being scanned. The imager board 9 is generally a printed circuit board that provides connectivity for the electronic components as well as a physical surface with which to provide mechanical stability. A person skilled in the art could envision another surface being used to provide the mechanical stability, and a different surface being used to provide the components with electrical conductivity. In the present invention, the imager board preferably contains a sensor, which is fabricated using a CMOS process. Those skilled in the art will know that any other suitable device can be used for the sensor such as a CCD.

Figure 3:
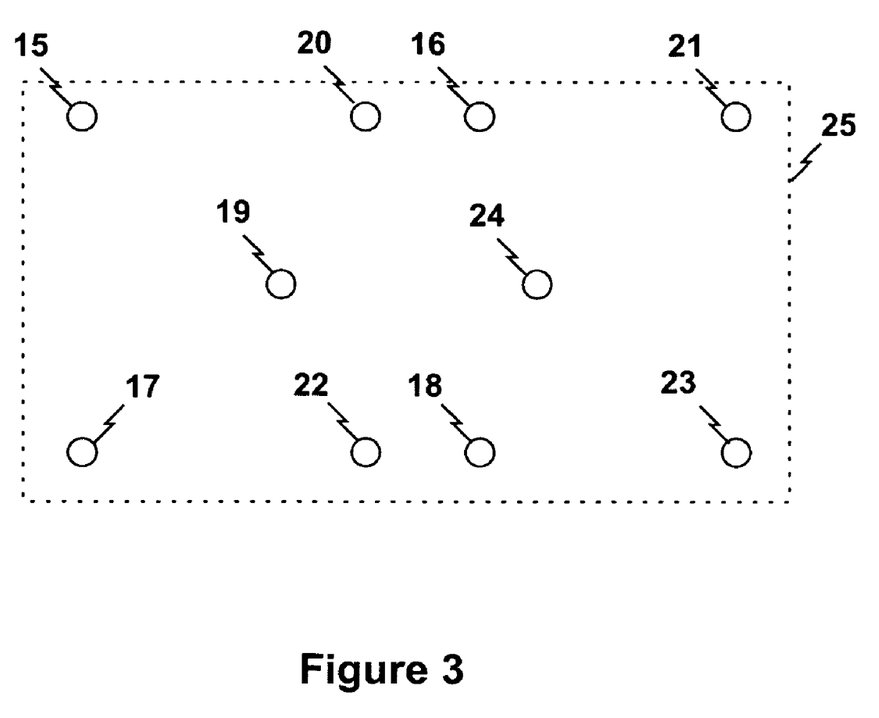
FIG. 3 is the resulting targeting pattern of the symbology reader of FIG. 1.

FIG. 3 shows the targeting pattern of the first embodiment of the present invention that results from placing optical elements 7 and 8 in front of lasers 4 and 5. Laser beam spots 15, 16, 17, 18 and 19 are generated from laser 5 and define the left side of the image field. Laser beam spots 20, 21, 22, 23 and 24 are generated from laser 4 and define the right side of the image field. Spots 15, 16, 17, 18, 20, 21, 22 and 23 define the outer boundary of the field of view (FOV) of the symbology reader. Anything beyond these spots will not be captured. Spots 19 and 24 define the horizontal boundary of the optical center of the target. The distance between the spots 19 and 24 is fixed and defined by the physical distance between laser 4 and 5 on the symbology reader 1. The dashed line 25 surrounding the targeting pattern shows the rectangular nature of the aspect ratio. The camera can be moved back and forth by the operator until laser beam spots 15, 16, 17, 18, 20, 21, 22 and 23 frame the target. The dual laser targeting system of the present invention has a large depth of field to support the targeting of different-sized standard symbologies.

Figure 4:
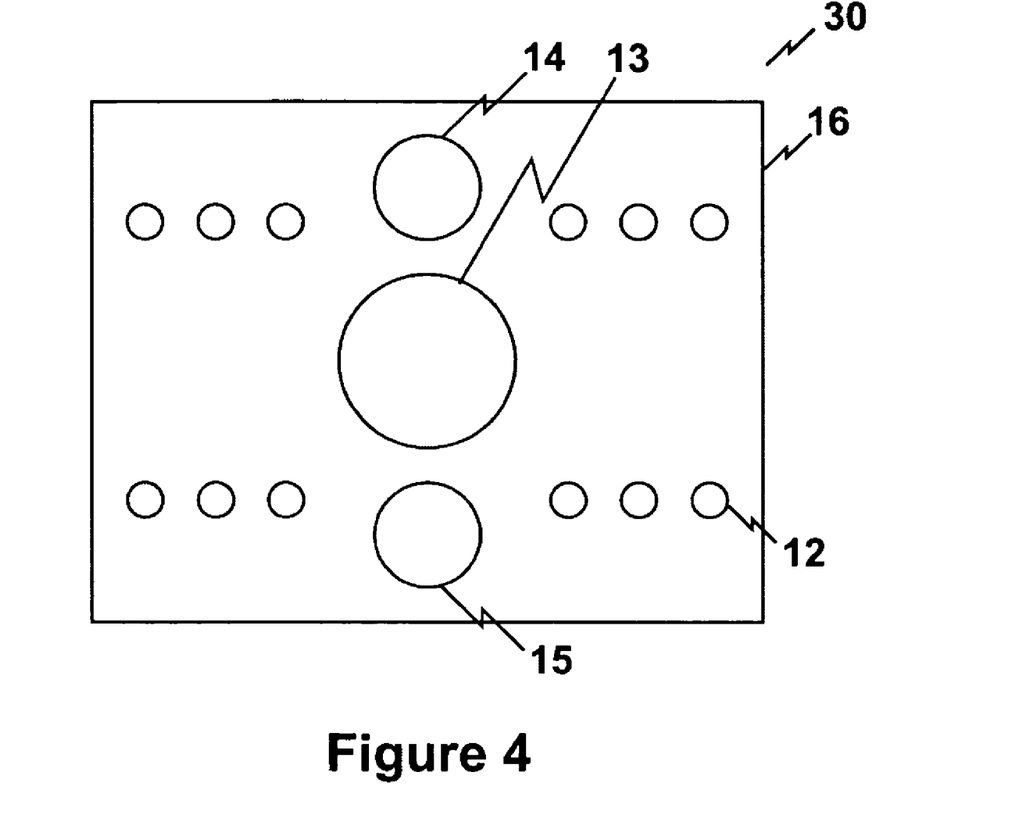
FIG. 4 is a front view of a second embodiment of a symbology reader in accordance with the present invention.

FIG. 4 shows an alternative embodiment of the present invention. FIG. 4 depicts the front view of camera module housing 16 of a symbology reader 30 comprising the dual laser system of the present invention. The lasers 14 and 15 in this embodiment are placed above and below the objective lens 13 respectively. The paths of the laser beams are still in parallel with the optical axis of the objective lens. Optical elements 17 and 18 (not shown) would also be placed in front of lasers 14 and 15.

Figure 5:
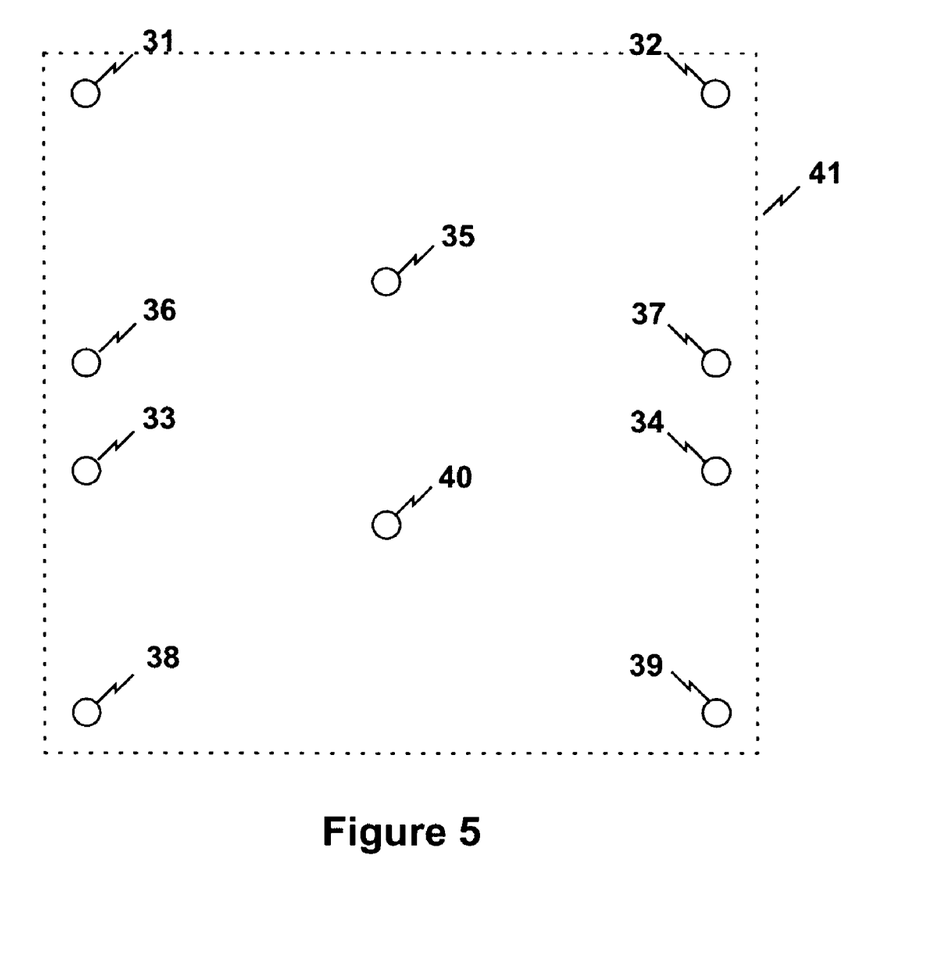
FIG. 5 is the resulting targeting pattern of the symbology reader of FIG. 4.

FIG. 5 shows the resulting targeting pattern of the alternative embodiment of FIG. 4. This pattern is similar to the pattern of FIG. 3, yet dashed line 42 shows the square nature of the aspect ratio compared to the rectangular aspect ratio of FIG. 3. Laser beam spots 31, 32, 33, 34 and 35 are generated from laser 14 and define the top half of the image field. Laser beam spots 36, 37, 38, 39 and 40 are generated from laser 15 and define the bottom half of the image field. Spots 31, 32, 33, 34, 36, 37, 38 and 39 define the outer boundary of the FOV of the symbology reader. Spots 35 and 40 define the vertical boundary of the optical center of the target. The distance between the 35 and 40 is fixed and defined by the physical distance between lasers 14 and 15 on the symbology reader 30.

One would use either the embodiment depicted in FIG. 1 or FIG. 4 depending on which one better suits the mechanical constraints and/or the ratio between the height and the width of the image to be captured. Combining FIGS. 1 and 4 for a four laser targeting system can generate a further embodiment. The present invention therefore is not limited to two lasers, as long as there is an even number of lasers (pairs of lasers) and each pair is equidistant from the objective lens 3.

Figure 6:
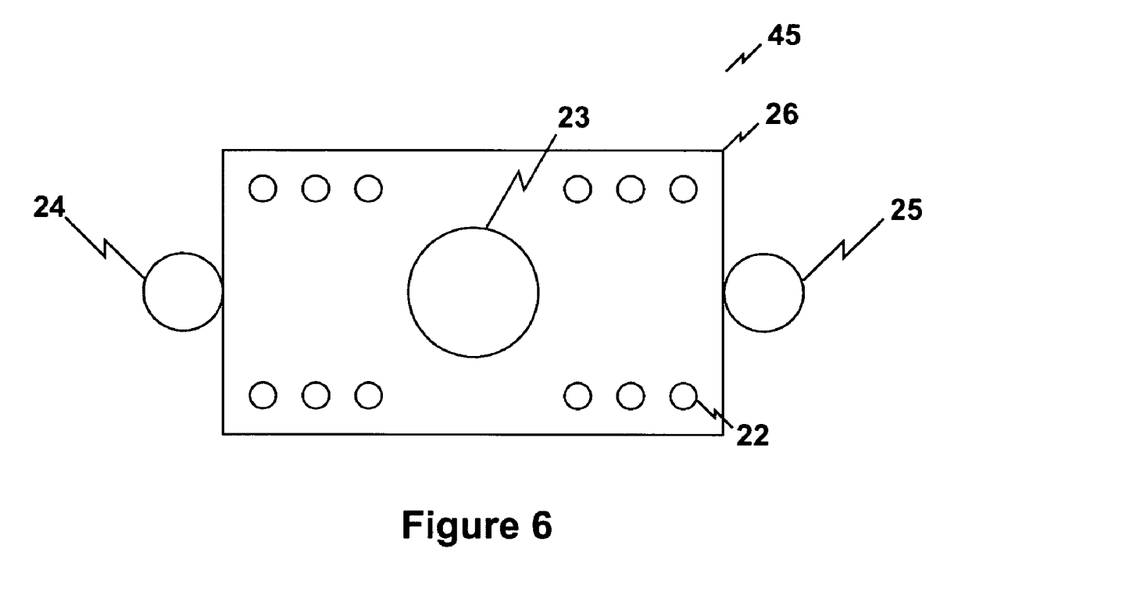
FIG. 6 is a front view of a third embodiment of a symbology reader in accordance with the present invention.

FIG. 6 shows another embodiment of the present invention. The front view of a camera module housing 26 of a symbology reader 45 shows that the two lasers 24 and 25 are not located within the camera module housing 26. Lasers 24 and 25 are placed on the exterior edges of the camera module housing 26. These lasers 24 and 25 could be placed either beside the objective lens as shown, or they could be placed above and below the objective lens. The benefit of having the lasers 24 and 25 outside of the camera module housing 26 is that the camera modules need not be customized with the dual lasers so any off-the-shelf camera modules can be placed into a symbology reader and the lasers can easily be aligned on the exterior of the pre-existing camera module to produce the dual laser targeting system of the present invention.

The targeting scheme of the present invention has many advantages such as permitting the symbology reader to operate within the parameters of the entire imaging range, that is, the entire range of distances in which a successful image acquisition is possible.

Further, this system is insensitive to scanning angles. If the operator is unable to scan directly over the symbology, the targeting pattern does not skew when scanning at an angle, but instead continues to represent the actual extent of the useful field of view (FOV). The targeting pattern will stretch, but in the manner consistent with the FOV and frames the target accurately. This pattern not only frames the boundaries of the target, but also highlights the optical center of the target for improved accuracy with techniques such as center-weighted discrimination where only the barcode in the center of the FOV is accepted and rejects the barcodes near the edges. This technique is useful in situations where there are multiple barcodes on one label.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A laser targeting system for positioning a symbology reader having an objective lens with an optical axis for reading a target comprising:
   a housing for accommodating an objective lens;
   at least one pair of lasers for projecting beams along axes of the lasers parallel to the objective lens optical axis, the paired lasers being positioned opposite one another on either side of the objective lens and symmetrically about the objective lens such that the axis of each laser and the objective lens optical axis are parallely aligned; and
   at least one pair of optical elements, each of the optical elements for producing a composite beam pattern having a plurality of beam spots symmetrically positioned about the laser axis, each beam pattern further including a beam spot on the corresponding laser axis, each of the paired optical elements being located at the side of the objective lens and in front of the corresponding laser, and being substantially aligned with the objective lens on the front side of the housing, the composite beam patterns being symmetrical with respect to each other, about the objective lens optical axis and substantially matching the boundary of a field of view of the symbology reader, regardless of the scanning angle of the symbology reader.

2. A laser targeting system of claim 1 wherein the lasers are positioned equidistant from the objective lens optical axis.

3. A laser targeting system of claim 1 wherein the plurality of beam spots about each laser axis include four beam spots symmetrically positioned about the laser axis.

4. A laser targeting system of claim 1 wherein the optical elements comprise prisms, diffractive optical elements or holographic optical elements.

5. A laser targeting system of claim 1 wherein the objective lens and the targeting system are mounted in the housing, each of the paired optical elements being substantially aligned with the front side of the objective lens, on the front side of the housing.

6. A laser targeting system of claim 1 wherein the objective lens is accommodated in the housing of a symbology reader, each of the paired optical elements being placed on the exterior edge of the housing and the optical elements being substantially aligned with the front side of the objective lens, on the front side of the housing.

7. A laser targeting system of claim 1 wherein the at least one pair of lasers includes two pairs of lasers and wherein the lasers are positioned symmetrically about the objective lens.

8. A laser targeting system of claim 7 wherein the lasers are positioned equidistant from the objective lens optical axis.

9. A laser targeting system of claim 1 wherein the beam spots on the laser axes define the boundary of the optical center of the target.

* * * * *

UNITED STATES PATENT AND TRADEMARK OFFICE
CERTIFICATE OF CORRECTION

PATENT NO. : 7,878,405 B2  
APPLICATION NO. : 11/006163  
DATED : February 1, 2011  
INVENTOR(S) : Kricorissian Page 1 of 1

It is certified that error appears in the above-identified patent and that said Letters Patent is hereby corrected as shown below:

Title Page, Item (57), under "ABSTRACT", in Column 2, Line 10, delete "axes" and insert -- axis --, therefor.

In Column 1, Line 62, delete "axes" and insert -- axis --, therefor.

In Column 5, Line 15, in Claim 1, delete "axes" and insert -- axis --, therefor.

In Column 6, Line 20, in Claim 6, after "and", delete "the optical elements".

In Column 6, Line 29, in Claim 9, delete "axes" and insert -- axis --, therefor.

Signed and Sealed this  
Nineteenth Day of March, 2013

Teresa Stanek Rea  
*Acting Director of the United States Patent and Trademark Office*